Nov. 27, 1934.   E. KÄGI   1,982,108
LIQUID LEVEL REGULATING APPARATUS
Filed Jan. 23, 1933
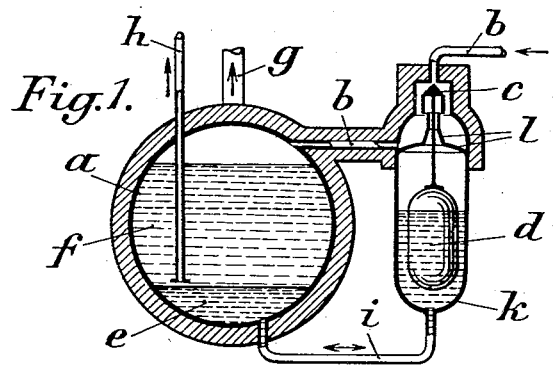
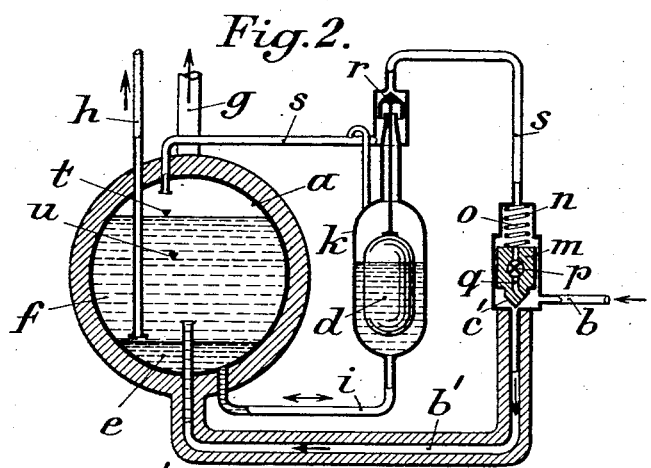
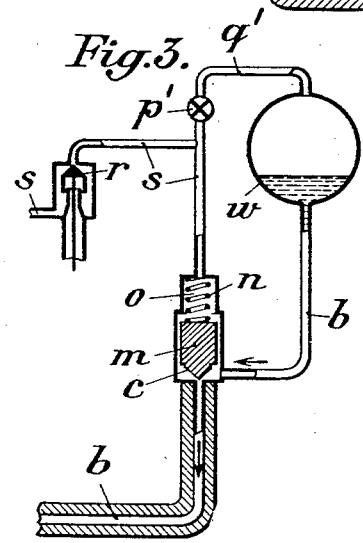
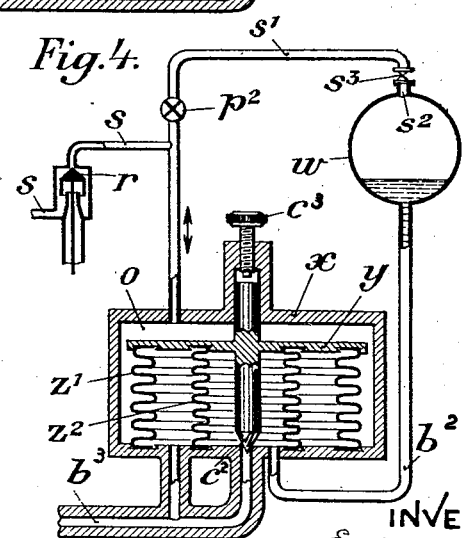
INVENTOR:
Emil Kägi
BY
Pennie Davis Marvin & Edmonds
ATTORNEY.

Patented Nov. 27, 1934

1,982,108

UNITED STATES PATENT OFFICE 1,982,108

LIQUID LEVEL REGULATING APPARATUS

Emil Kägi, Winterthur, Switzerland, assignor to firm Sulzer Freres Societe Anonyme, Winterthur, Switzerland Application January 23, 1933, Serial No. 653,129 In Switzerland February 9, 1932

10 Claims. (Cl. 62—8)

This invention relates to liquid level regulating apparatus particularly, though not exclusively, for use with refrigerating machines and of the kind in which the supply of liquid to a main container such, for example, as the evaporator of a refrigerating machine, is regulated by a float arranged within a chamber separate from but communicating with the main container, the float being actuated in accordance with the level of the liquid within the main container.

When, as for example in the case of refrigerating machines, the float in the separate chamber is acted upon directly by the liquid within the evaporator, the agitation of this liquid during its evaporation tends to impart undesirable vibration or movements to the float with the result that regulation of the liquid supply is unsteady. The object of the present invention is to provide improved apparatus whereby this difficulty will be overcome.

To this end according to the present invention the float is immersed in and actuated by a liquid the specific gravity of which exceeds that of the main body of liquid in the main container.

Preferably the liquid in the float chamber is such that it will not boil when the liquid in the main container has reached boiling point. Thus, in the case of refrigerating apparatus, the float chamber may communicate with the evaporator so that lubricant derived from the evaporator and having a specific gravity which exceeds that of the refrigerant is maintained in the float chamber at a level indicative of the level of the refrigerant within the evaporator.

Four constructions of apparatus according to the invention are illustrated somewhat diagrammatically and by way of example as applied to refrigerating apparatus, in the accompanying drawing, in which, Figure 1 illustrates one construction, Figure 2 shows another construction, Figure 3 is a further construction which is a modification of that shown in Figure 2 and Figure 4 illustrates yet another construction.

In the construction illustrated in Figure 1 liquid refrigerant such, for example, as ammonia is fed to the evaporator $a$ of the refrigerating machine through a feed pipe $b$ controlled by a valve $c$ which is actuated by a float $d$. Lubricant which has entered the evaporator with the refrigerant collects as shown at $e$ below the main body of the refrigerant $f$ within the evaporator. The evaporated refrigerant returns to the compressor (not shown) through a pipe $g$, lubricant passing to the compressor through a pipe $h$.

The evaporator $a$ communicates through a pipe $i$ with a chamber $k$ within which the float $d$ is arranged so that the chamber $k$ contains only lubricant whereby the float $d$ is actuated, a wall $l$ being provided between the float chamber and the valve $c$ so as to prevent refrigerant passing from the pipe $b$ into the float chamber $k$.

It will thus be seen that though the float $d$ will be actuated in accordance with the level of the liquid refrigerant within the evaporator $a$ the float will not be subjected to disturbances due to agitation or bubbling of the refrigerant whilst this is evaporating. In this way a steady operation of the valve $c$ to control the supply of refrigerant to the evaporator is ensured.

In the construction illustrated in Figure 2 the control of the supply of refrigerant from the condenser to the evaporator $a$ is effected indirectly by the float $d$ instead of directly as described with reference to Figure 1. Thus in the construction illustrated in Figure 2 liquid refrigerant is supplied from the condenser (not shown) to the evaporator $a$ through a conduit $b^1$ controlled by a valve device $c^1$ comprising a control member $m$ in the form of a plunger loaded by a spring $n$ arranged within a chamber $o$. The chamber $o$ communicates with the inlet of the pipe $b^1$ through a throttling device $p$ which is preferably adjustable and is arranged within a bore $q$ in the plunger $m$. The float valve $d$, which is actuated as described with reference to Figure 1, operates a valve $r$ so as to control a subsidiary pipe $s$ communicating at one end with the evaporating space of the evaporator $a$ and at the other end with the chamber $o$. The lower face of the plunger $m$ is at all times exposed to the condenser pressure whilst the upper face of the plunger $m$ is exposed to the pressure of the spring $n$.

When the liquid level within the evaporator $a$ is at its maximum indicated at $t$ the lubricant within the float chamber $k$ raises the float $d$ so as to close the valve $r$ whereupon the pressure applied by the refrigerant on the upper and lower face of the plunger $m$ is equalized so that the spring $n$ closes the valve $c$ and thus cuts off the supply of refrigerant to the evaporator $a$. When however the liquid level in the evaporator drops, for example to the level indicated at $u$, the valve $r$ is opened so that the pressure within the chamber $o$ falls and the plunger $m$ is raised against the action of the spring $n$ and the valve $c$ is opened whereby more refrigerant is supplied to the evaporator to restore the liquid level to the valve indicated at $t$.

As will be readily seen the valve $r$ is, as in the construction described with reference to Figure 1, constructed with a view to preventing liquid refrigerant flowing from the subsidiary pipe $s$ into the float chamber $k$. If desired, however, the tendency for liquid refrigerant to flow into the float chamber $k$ in this manner may be reduced by providing an auxiliary evaporator in the pipe $s$. Instead of arranging the throttling device $p$ in the plunger $m$ this may be made solid as shown in Figure 3 with the pipe $s$ communicating through a throttling device $p^1$ and intermediate pipe $q^1$ with the evaporating space of the condenser indicated at $w$.

In the construction illustrated in Figure 4 a needle valve $c^2$ which is adjustable by means of a stud $c^3$ is arranged within a chamber $x$ and is furnished with an integral platelike portion $y$ connected in a liquid tight manner to the lower wall of the chamber by two flexible diaphragms $z^1$, $z^2$. The chamber formed within the inner diaphragm $z^2$ communicates with the liquid space of the condenser $w$ through an inlet pipe $b^2$ and also with the liquid space of the evaporator through a supply pipe $b^3$, the chamber formed between the diaphragms $z^1$ and $z^2$ communicating with the supply pipe $b^3$ as shown. The chamber $o$ outside the outer diaphragms $z^1$ communicates through the throttling device $p^2$ and an intermediate pipe $s^1$ with the vapour space of the condenser $w$. Thus when the float actuated valve $r$ is closed the valve $c^2$ will move downwards into its closed position and the supply of refrigerant to the evaporator will be thus cut-off. When on the other hand the float actuated valve $r$ is opened the pressure within the chambers enclosed by the diaphragms $z^1$, $z^2$ will exceed the pressure in the chamber $o$ so that the valve $c^2$ will be raised from its seat and will remain open until the valve $r$ is again closed by the float.

The throttling device $p^2$ may also be connected to a space filled with lubricant, that is, to the liquid space of an oil separator combined with the condenser $w$, when the direct connection $s^2$ of the throttling device $p^2$ with the condenser $w$ must of course be broken. In this manner, in case it is impossible to prevent liquid finding its way into the float chamber, the entry of liquid, which may cause damage is at least avoided. By opening the closing member $s^3$, and closing an auxiliary closing member, the throttling device may be connected to the vapour space of the condenser when desired.

I claim:

1. In a refrigerating system including an evaporator containing a lubricant, and a refrigerant of lesser specific gravity, a container separate from the evaporator and communicating therewith in such a way that the lubricant will rise in the container from the evaporator to a level indicative of the amount of refrigerant in the evaporator, a float in said container for actuation by the lubricant moving therein and thereout, and means controlled by the float for regulating the supply of refrigerant to the evaporator.

2. In a refrigerating system having a condenser and an evaporator containing a lubricant and a refrigerant of lesser specific gravity; a liquid-level regulator comprising a chamber separate from said evaporator and communicating therewith through a conduit in such a way that lubricant from the evaporator can rise in said chamber, a float movable in said chamber, and means controlled by the movements of the float for controlling the refrigerant supplied to the evaporator, said means including a subsidiary conduit communicating with the evaporator and condenser, and a valve therein, said float being connected to said valve.

3. In a refrigerating system including a condenser and an evaporator containing a lubricant and a refrigerant of lesser density, a liquid-level regulator comprising a chamber separate from said evaporator and communicating therewith in such a way that lubricant therefrom will rise in the chamber, a float in said chamber for actuation by said lubricant, a subsidiary conduit communicating with the evaporator and condenser, a valve therein, said float communicating with said valve, another and lower conduit for supplying refrigerant directly to the evaporator from the condenser, and control means therein for regulating the direct flow of refrigerant from the condenser to the evaporator.

4. In a refrigerating system including a condenser and an evaporator containing a lubricant and a refrigerant of lesser density, a liquid-level regulator comprising a chamber separate from said evaporator and communicating therewith in such a way that lubricant therefrom will rise in the chamber, a float in said chamber for actuation by said lubricant, a subsidiary conduit communicating with the evaporator and condenser, a valve therein, said float communicating with said valve, another and lower conduit for supplying refrigerant directly to the evaporator from the condenser, control means therein for regulating the direct flow of refrigerant from the condenser to the evaporator, said last control means comprising a chamber communicating at one end with the condenser, and at the other, with the evaporator, and a control-member movable within the chamber.

5. In a refrigerating system including a condenser and an evaporator containing a lubricant and a refrigerant of lesser density, a liquid-level regulator comprising a chamber separate from said evaporator and communicating therewith in such a way that lubricant therefrom will rise in the chamber, a float in said chamber for actuation by said lubricant, a subsidiary conduit communicating with the evaporator and condenser, a throttling device therein connected to said float, another and lower conduit for supplying auxiliary refrigerant to the evaporator, and control means for regulating the flow of refrigerant through said last pipe, said means comprising a chamber communicating at one end with the subsidiary conduit through a throttling device and at the other end with the evaporator through a valve in said lower conduit, said valve being actuated by said float and consisting of a plug-member movable in said last chamber.

6. In a refrigerating system including a condenser and an evaporator containing a lubricant and a refrigerant of lesser density, a liquid-level regulator comprising a chamber separate from said evaporator and communicating therewith in such a way that lubricant therefrom will rise in the chamber, a float in said chamber for actuation by said lubricant, a subsidiary conduit communicating with the evaporator and condenser, a valve therein, said float communicating with said valve, another and lower conduit for supplying refrigerant directly to the evaporator from the condenser, control means therein for regulating the direct flow of refrigerant from the condenser to the evaporator, said last control means comprising a chamber communicating at one end with the condenser, and at the other, with the evaporator, a control-member movable within the chamber, and means for preventing liquid refrigerant which passes through the first-said, subsidiary conduit from entering the float chamber.

7. In a refrigerating system including a condenser and an evaporator containing a lubricant and a refrigerant of lesser density, a liquid-level regulator comprising a chamber separate from said evaporator and communicating therewith in such a way that lubricant therefrom will rise in the chamber, a float in said chamber for actuation by said lubricant, a subsidiary conduit communicating with the evaporator and condenser, a valve therein, said float communicating with said valve, another and lower conduit for supplying refrigerant directly to the evaporator from the condenser, control means therein for regulating the direct flow of refrigerant from the condenser to the evaporator, said last control means comprising a chamber communicating at one end with the condenser, and at the other, with the evaporator, and a movable member within the chamber, the said member comprising a throttling device located in the said movable member and being unitary therewith.

8. In a refrigerating system including a condenser and an evaporator containing a lubricant and a refrigerant of lesser density, a liquid-level regulator comprising a chamber separate from said evaporator and communicating therewith in such a way that lubricant therefrom will rise in the chamber, a float in said chamber for actuation by said lubricant, a subsidiary conduit communicating with the evaporator and condenser, a valve therein, said float communicating with said valve, another and lower conduit for supplying refrigerant directly to the evaporator from the condenser, control means therein for regulating the direct flow of refrigerant from the condenser to the evaporator, said last control means comprising a chamber communicating at one end with the condenser, and at the other, with the evaporator, and a control-member movable within the chamber, the said member having a throttling-device communicating on one side with the liquid space of the condenser, and on the opposite side through said throttling device with the vapor space of the evaporator.

9. In a refrigerating system including a condenser and an evaporator containing a lubricant and a refrigerant of lesser density, a liquid-level regulator comprising a chamber separate from said evaporator and communicating therewith in such a way that lubricant therefrom will rise in the chamber, a float in said chamber for actuation by said lubricant, a subsidiary conduit communicating with the evaporator and condenser, a valve therein, said float communicating with said valve, another and lower conduit for supplying refrigerant directly to the evaporator from the condenser, control means therein for regulating the direct flow of refrigerant from the condenser to the evaporator, said last control means comprising a chamber communicating at one end with the condenser, and at the other, with the evaporator, a control-member movable within the chamber and comprising a throttling-device, and means for adjusting said throttling-device.

10. In a refrigerating system including a condenser and an evaporator containing a lubricant and a refrigerant of lesser density, a liquid-level regulator comprising a chamber separate from said evaporator and communicating therewith in such a way that lubricant therefrom will rise in the chamber, a float in said chamber for actuation by said lubricant, a subsidiary conduit communicating with the evaporator and condenser, a valve therein, said float communicating with said valve, another and lower conduit for supplying refrigerant directly to the evaporator from the condenser, control means therein for regulating the direct flow of refrigerant from the condenser to the evaporator, said last control means comprising a chamber communicating at one end with the condenser, and at the other, with the evaporator, and a control-member movable within the chamber, said movable member consisting of concentric diaphragms.

EMIL KÄGI.